(12) United States Patent
Young et al.

(10) Patent No.: US 12,196,964 B2
(45) Date of Patent: Jan. 14, 2025

(54) TRANSPARENT DISPLAY SYSTEM WITH PERIPHERAL ILLUMINATION

(71) Applicant: Apple Inc., Cupertino, CA (US)

(72) Inventors: Austin S. Young, Sunnyvale, CA (US); Cameron A. Harder, San Francisco, CA (US); David A. Kalinowski, Davis, CA (US); Jae Hwang Lee, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 16/915,168

(22) Filed: Jun. 29, 2020

(65) Prior Publication Data

US 2021/0063745 A1    Mar. 4, 2021

Related U.S. Application Data

(60) Provisional application No. 62/892,398, filed on Aug. 27, 2019.

(51) Int. Cl.
| | | |
|---|---|---|
| *G02B 27/01* | (2006.01) | |
| *G02B 27/62* | (2006.01) | |
| *G02B 26/10* | (2006.01) | |
| *G09G 3/22* | (2006.01) | |

(52) U.S. Cl.
CPC ......... *G02B 27/0172* (2013.01); *G02B 27/01* (2013.01); *G02B 27/017* (2013.01); *G02B 27/62* (2013.01); *G02B 26/10* (2013.01); *G02B 2027/0123* (2013.01); *G02B 27/0176* (2013.01); *G02B 2027/0178* (2013.01); *G09G 3/22* (2013.01)

(58) Field of Classification Search
CPC .. G02B 27/01; G02B 27/017; G02B 27/0172; G02B 27/0176; G02B 27/0178; G02B 27/0179; G02B 27/62; G02B 2027/0123; G02B 2027/0178; G02B 26/10; G09G 3/22
USPC ........................................................ 345/7, 8
See application file for complete search history.

(56) References Cited

U.S. PATENT DOCUMENTS

| | | | |
|---|---|---|---|
| 9,097,890 B2 | 8/2015 | Miller et al. | |
| 9,097,891 B2 | 8/2015 | Border et al. | |
| 9,454,010 B1* | 9/2016 | Passmore | G02B 3/0087 |
| 10,488,665 B2* | 11/2019 | Sahlsten | G02B 27/017 |
| 2012/0194550 A1 | 8/2012 | Osterhout et al. | |
| 2012/0194552 A1 | 8/2012 | Osterhout et al. | |

(Continued)

*Primary Examiner* — Jason M Mandeville
(74) *Attorney, Agent, or Firm* — Treyz Law Group, P.C.; G. Victor Treyz; David K. Cole

(57) ABSTRACT

An electronic device such as a head mounted device may have a head-mounted support structure. A portion of the head-mounted support structure may form a transparent housing member through which real-world objects can be viewed from eye boxes. A display system for the head-mounted device may have a display device that provides image light to a waveguide and may have an output coupler that couples the image light out of the waveguide toward the eye box. Peripheral portions of the transparent housing member or other peripheral device structures may be provided with a peripheral display that emits diffuse light into a user's peripheral vision. The peripheral display may use light guide structures, light sources, reflective structures, and other structures that provide transparency to real-world light.

19 Claims, 7 Drawing Sheets

(56) References Cited

U.S. PATENT DOCUMENTS

| | | | |
|---|---|---|---|
| 2013/0208014 A1 | 8/2013 | Fleck et al. | |
| 2013/0214998 A1 | 8/2013 | Andes et al. | |
| 2014/0146394 A1 | 5/2014 | Tout et al. | |
| 2017/0285344 A1 | 10/2017 | Benko et al. | |
| 2017/0287225 A1 | 10/2017 | Powderly et al. | |
| 2017/0357089 A1* | 12/2017 | Tervo | G02B 6/0026 |
| 2018/0018943 A1 | 1/2018 | Clarke et al. | |
| 2018/0096471 A1 | 4/2018 | Wilson et al. | |
| 2018/0136471 A1* | 5/2018 | Miller | G02B 27/0093 |
| 2019/0018247 A1 | 1/2019 | Gao et al. | |
| 2019/0064526 A1* | 2/2019 | Connor | G02B 6/0073 |
| 2019/0094981 A1 | 3/2019 | Bradski et al. | |
| 2020/0348518 A1* | 11/2020 | Georgiou | G02B 27/0172 |

\* cited by examiner

TRANSPARENT DISPLAY SYSTEM WITH PERIPHERAL ILLUMINATION

This application claims the benefit of provisional patent application No. 62/892,398, filed Aug. 27, 2019, which is hereby incorporated by reference herein in its entirety.

BACKGROUND

This relates generally to electronic devices and, more particularly, to electronic devices with optical components.

Electronic devices sometimes include optical components. For example, a wearable electronic device such as a head-mounted device may include a display for displaying an image.

To allow a head-mounted device to display a computer-generated image that is overlaid on top of real-world images, the head-mounted device may have a transparent display system. The system may have an optical combiner that merges real-world image light with computer-generated content.

It can be challenging to provide a head-mounted device with desired optical properties. The angular range of computer-generated images may be restricted due to constraints on device size and complexity. As a result, it is often not possible to provide satisfactory visual output in a user's peripheral vision. This can create situations where computer-generated objects are abruptly cut off as they move out of the center of a display. It can also make it difficult or impossible for a user to be alerted to the presence of computer-generated content that is in the user's peripheral vision.

SUMMARY

An electronic device such as a head-mounted device may have a head-mounted support structure. A portion of the head-mounted support structure may form a transparent housing member through which real-world objects can be viewed from eye boxes.

The head-mounted device may have a main display that merges display images with real world images in a central portion of the transparent housing. A peripheral display system may be used to provide diffuse illumination around the periphery of the main display.

The main display may have a display device that provides image light to a waveguide and may have an output coupler that couples the image light out of the waveguide toward an eye box. Peripheral portions of the transparent housing member may be provided with a peripheral display formed from edge lit light guide structures, light sources mounted in a rim member that runs along a peripheral edge of the transparent housing member, a light source that reflects light at an non-zero angle toward the eye box from a dispersion film on the transparent housing member, and/or light-emitting dies mounted to the transparent housing member.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain optical components such as a display for displaying visual content. The head-mounted support structures may support the display. The display may be part of an optical system that combines real-world image light with light from an image source. In this way, computer-generated images (sometimes referred to as virtual images) may be overlaid on top of real-world images.

Figure 1:
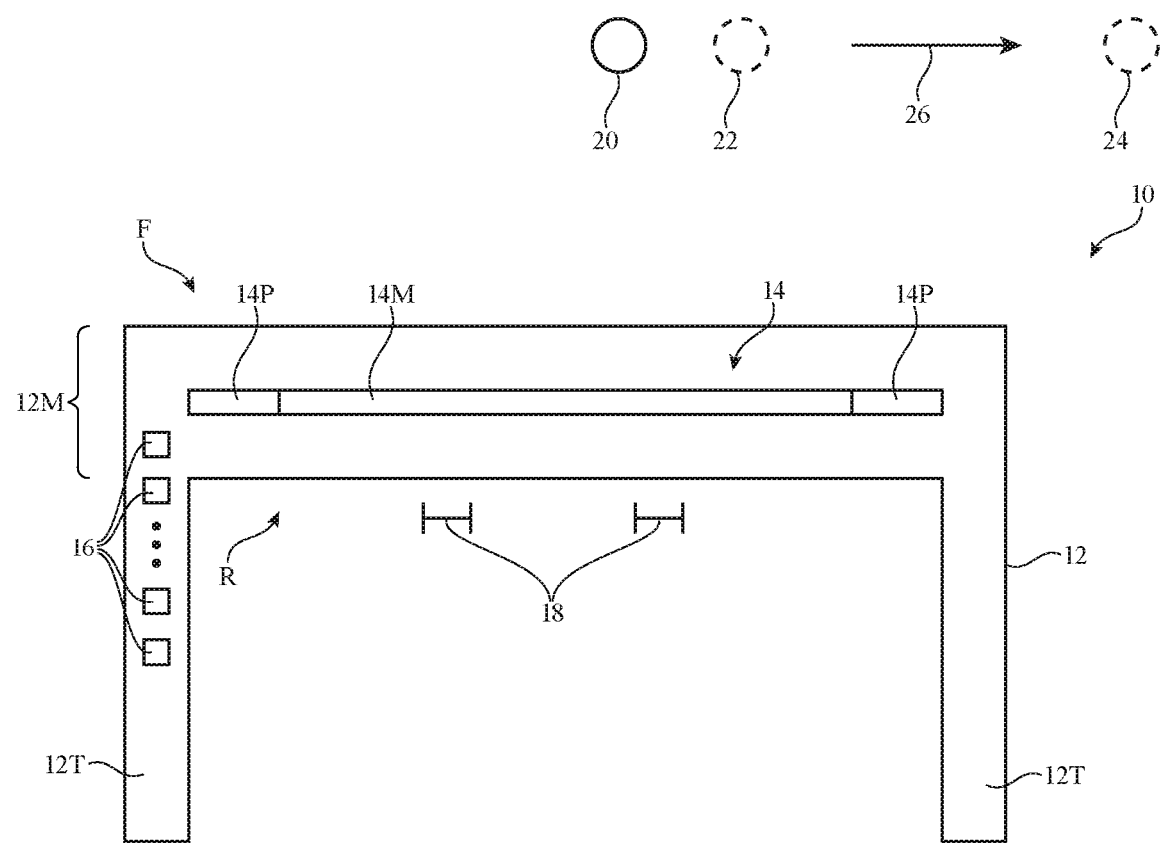
FIG. 1 is a top view of an illustrative electronic device such as a head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portion 12T to allow device 10 to be worn on a user's head. Main housing portion 12M may include optical components 14 (e.g., a display, lenses, etc.). Housing structures such as internal support structures 121 may support lenses and other optical components 14 (e.g., structures 121 may serve as lens support structures).

Housing 12 may include a transparent housing member (sometimes referred to as a transparent housing layer). Display structures may be formed in the center of the transparent housing member and around peripheral portions of the transparent housing member. In some configurations, an opaque rim member may run along some or all of the peripheral edge of the transparent housing member.

Front face F of housing 12 may facing outwardly away from a user's head. Rear face R of housing 12 may face the user. During operation, a user's eyes are placed in eye boxes 18. When the user's eyes are located in eye boxes 18, the user may view content being displayed by optical components 14. Optical components 14 may be mounted on the surface of a transparent housing member and/or may include components embedded in one or more housing structures. In some configurations, which are sometimes described herein as an example, optical components 14 include an optical combiner that is used to combine a real-world image (light from real-world objects) with a display image (e.g., light associated with computer-generated content). In this way, a computer-generated image (virtual object) may be displayed on top of real-world content.

In addition to optical components 14, device 10 may contain other electrical components 16. Components 14 and/or 16 may include integrated circuits, discrete components, printed circuits, and other electrical circuitry. For example, these components may include control circuitry and input-output devices.

The control circuitry of device 10 may include storage and processing circuitry for controlling the operation of device 10. The control circuitry may include storage such as hard disk drive storage, nonvolatile memory (e.g., electrically-programmable-read-only memory configured to form a solid-state drive), volatile memory (e.g., static or dynamic random-access-memory), etc. Processing circuitry in the control circuitry may be based on one or more microprocessors, microcontrollers, digital signal processors, baseband processors, power management units, audio chips, graphics processing units, application specific integrated circuits, and other integrated circuits. Software code may be stored on storage in the control circuitry and run on processing circuitry in the control circuitry to implement control operations for device 10 (e.g., data gathering operations, operations involving the adjustment of the components of device 10 using control signals, etc.). Control circuitry in device 10 may include wired and wireless communications circuitry. For example, the control circuitry may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 (e.g., input-output devices in components 16) may be used to allow a user to provide device 10 with user input. Input-output devices may also be used to gather information on the environment in which device 10 is operating. Output components in the input-output devices may allow device 10 to provide a user with output and may be used to communicate with external electrical equipment.

The input-output devices of device 10 may include one or more displays. In some configurations, a display in device 10 may include left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or or other left and right display devices in alignment with the user's left and right eyes, respectively. In other configurations, the display includes a single display panel that extends across both eyes or uses other arrangements in which content is provided with a single pixel array.

The display of device 10 is used to display visual content for a user of device 10. The content that is presented on the display may include virtual objects and other content that is provided to display 14 by control circuitry 12 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display). Configurations in which an optical combiner that is associated with display 14 is used to merge real-world images with display images are sometimes described herein as an example.

The input-output circuitry of device 10 may include sensors. The sensors may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in the input-output devices of device 10. If desired, device 10 may include haptic output devices (e.g., vibrating components), light-emitting diodes and other light sources, speakers such as ear speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

Some or all of housing 12 may serve as support structures (see, e.g., housing portion 12T). In configurations in which electronic device 10 is a head-mounted device (e.g., a pair of glasses, goggles, a helmet, a hat, etc.), portion 12T and/or other portions of housing 12 may serve as head-mounted support structures (e.g., structures forming a helmet housing, head straps, temples in a pair of eyeglasses, goggle housing structures, and/or other head-mounted structures). The head-mounted support structures may be configured to be worn on a head of a user during operation of device 10 and may support display(s), lenses, sensors, other input-output devices, control circuitry, and/or other components.

As shown in FIG. 1, display 14 may include main portion such as main display 14M and peripheral portions such as peripheral display 14P. Main display 14M may be a high-resolution display for displaying computer-generated images to a user. Display 14M may have an optical combiner and/or other optical structures that allow a user with eyes located in eye boxes 18 to view external real-world objects such as real-world object 20. Display 14M may include a display device that creates the computer-generated images. The optical combiner of display 14M allows these images to be overlaid on top of real-world objects as shown by illustrative virtual object 22.

Peripheral display 14P may be located about the periphery of device 10 out of the center of the user's field of view. Peripheral display 14P may have a pixel density (pixels per inch value) that is at least ten times less than that of display 14P, at least 100 times less than that of display 14P, or that is at least 250 times less than that of main portion 14M (as examples). Display 14P may be a transparent display (e.g., display 14P may allow light emitted from display 14P to be merged with light from real-world objects that a user is viewing through display 14P).

Display 14M may have lens structures (glass or polymer lens elements, holographic gratings with embedded lens functionality, mirror lenses, and/or other lens structures) for presenting an in-focus version of virtual object 22 to eye boxes 18. Peripheral displays 14P may contain light sources that create diffuse light in the user's peripheral vision. The diffuse light may create a diffuse illuminated object such as diffuse object 24 of FIG. 1, but, because no lenses are included between display 14P and eye boxes 18, the illumination associated with diffuse object 24 will generally be too unfocused to be used in displaying a sharp image for the user (as an example). Nevertheless, because human visual acuity is low in peripheral regions, the diffuse nature of the light emitted by displays 14P may not be noticeable and/or may not be objectionable to the user. This allows the diffuse illumination provided by displays 14P to supplement the images produced by main display 14M.

With this type of arrangement, main display 14M is used to present text, graphics, and other visual objects that are in focus, whereas peripheral displays 14P help provide continuity as on-screen objects such as object 22 move to the user's peripheral vision and vice versa. Consider, as an example, a scenario in which object 22 is a character in a game. The character may move to the right in direction 26. As the character moves to the user's peripheral vision, a diffuse area of light that corresponds to the character can be displayed by see-through display 14P. Due to the presence of display 14P, there will not be a sharp cut-off location where the character will suddenly disappear from view. Rather, when the character reaches the user's peripheral vision (e.g., the portion of the user's vision that is outside of a circle of at least 60° in diameter or at least 120° in diameter about the user's point of gaze), the character will be replaced by corresponding diffuse illumination (e.g., a fuzzy unfocused version of the character). This provides the user with the visual illusion that the character has moved into the user's peripheral vision (sometimes referred to as object persistence).

The same type of behavior may be used to create object persistence when objects move from the user's peripheral vision to the use's normal (non-peripheral) vision. For example, it may be desirable for device 10 to alert the user to a virtual menu in a coffee shop. The presence of the menu may be made clear to the user by creating a diffuse version of the menu in the user's peripheral vision. Once the user's attention has been gained in this way and the user's point-of-gaze has become directed directly at the menu, display 14M can display a high resolution version of the menu (e.g., a computer-generated menu image).

If desired, display 14P may be used to display light that serves as an alert (e.g., an alert that an incoming message has been received by device 10, an alert that a timer has expired, etc.). Patterns of light of one or more colors, one or more light intensities, fixed light and/or pulsed light of one or more different pulse durations, etc. may serve as alerts or may be used to provide a user with other information without necessarily involving the use of display 14P to present visual information corresponding to a particular spatial orientation. By using display 14P to display light that does not interfere with the operation of main display 14M, a user may be provided with an alert or other information without disturbing the user's view of real-world objects through display 14M.

Figure 2:
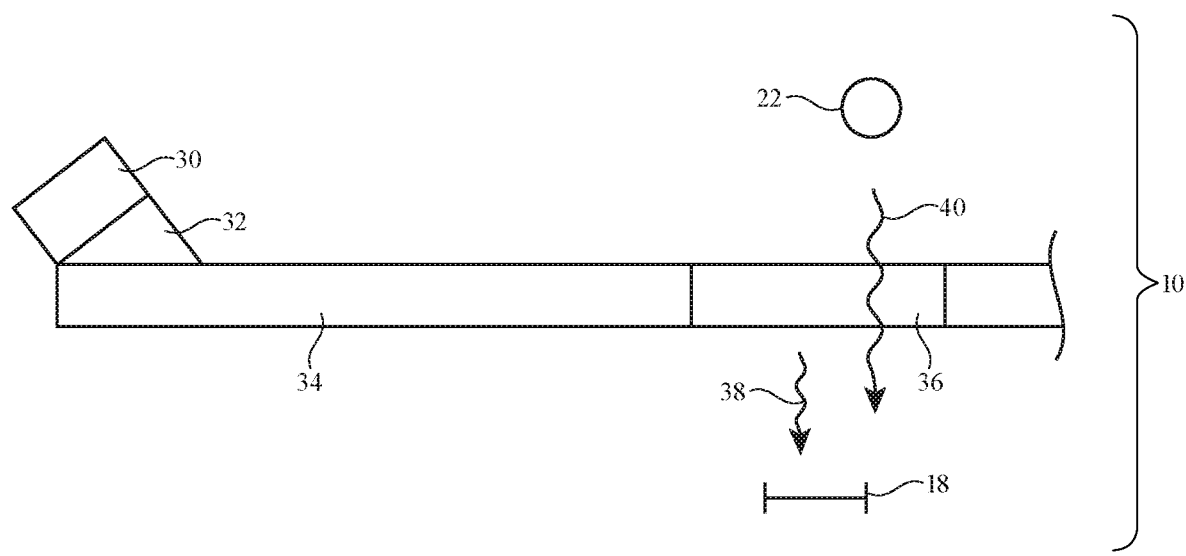
FIG. 2 is a top view of an illustrative optical system for merging real-world image light and display image light for a user in accordance with an embodiment.

FIG. 2 is a top view of an illustrative optical system that may be used for main display 14M. In the example of FIG. 2, main display 14M includes components for providing an image to the user's left eye. Main display 14M may also include a right-eye display system. As shown in FIG. 2, display 14M may have a display device such as display device 30 (e.g., a scanning display device, a liquid crystal on silicon display device, or other device that generates images). Optical coupler 32 (and/or, if desired, an optical input coupler such as a holographic input coupler) may be used to couple image light from display device 30 into waveguide 34, where this display light is conveyed to output coupler 36 in accordance with the principal of total internal reelection. Optical coupler 36 may be a holographic optical coupler or other optical coupler that couples image light from waveguide 34 out towards eye box 18 as shown by image light 38. Optical coupler 36 may be transparent in transmission, which allows the user to view real-world objects from eye box 18 (see, e.g., real-world light 40 from real-world object 22).

Figure 3:
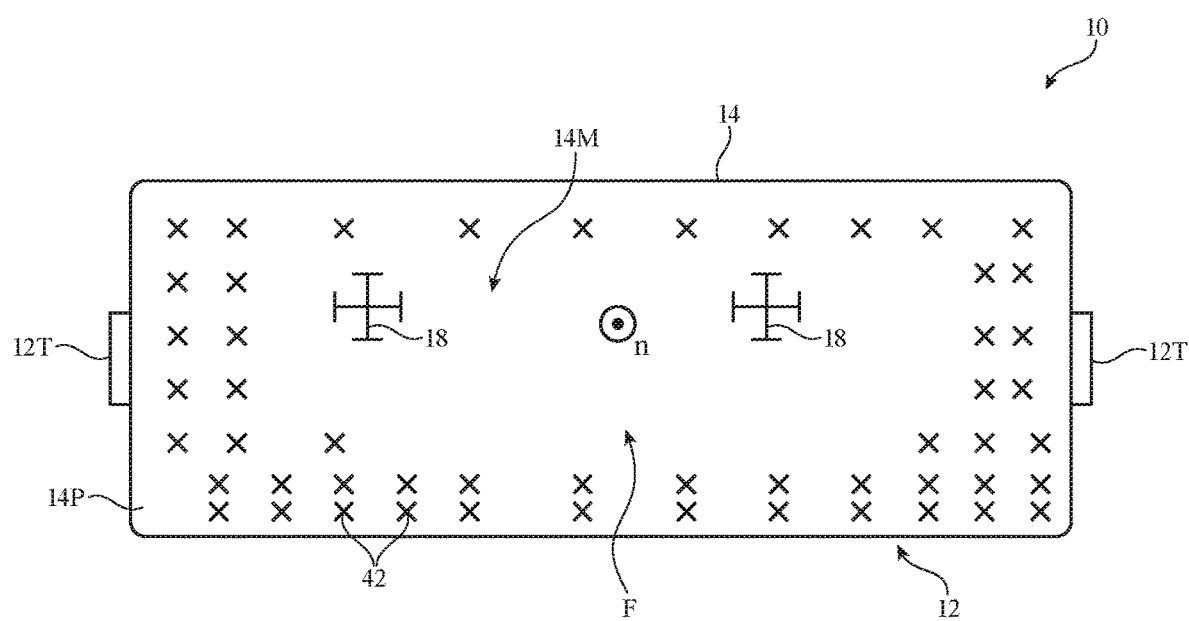
FIG. 3 is a front view of an illustrative electronic device in accordance with an embodiment.

FIG. 3 is a front view of device 10 showing how display 14P may surround peripheral regions of device 10 and may surround main display 14M in the center of the transparent housing member on front face F. During operation, display 14P may provide diffuse illumination in the user's peripheral vision. Display 14P may have individually addressable light-emitting elements 42 that emit illumination for viewing in the user's peripheral vision (e.g., when the user's eyes are located in eye boxes 18 and when the user's point of gaze is directly ahead, parallel to surface normal n of front face F of device 10). There may be any suitable number N of elements 42 in device 10 (e.g., at least 10, at least 100, at least 1000, fewer than 50,000, fewer than 10,000, fewer than 2,000, fewer than 500, fewer than 200, fewer than 50, or other suitable amount.

Figure 4:
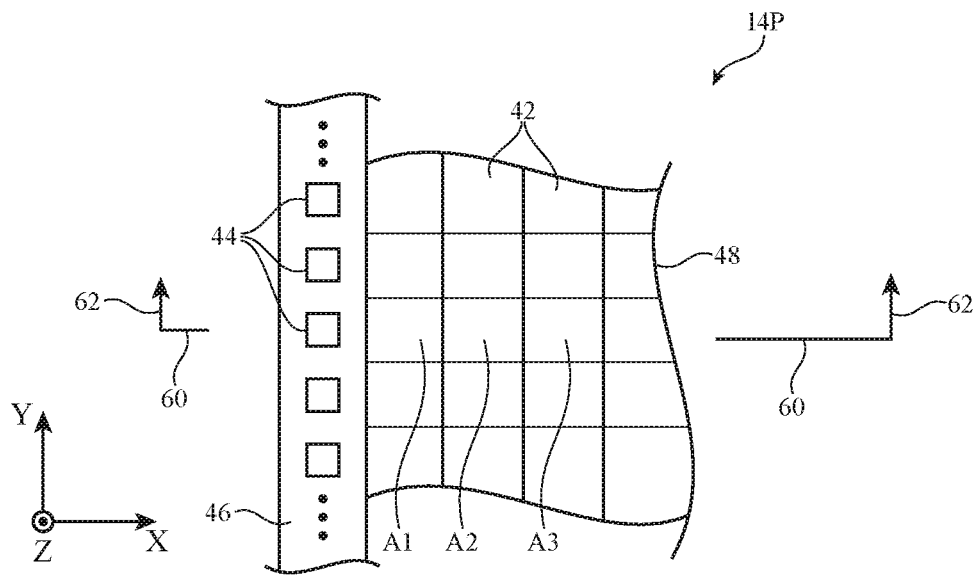
FIG. 4 is a diagram of a peripheral portion of an electronic device with peripheral illumination structures in accordance with an embodiment.

FIG. 4 shows how display 14P may have an array of elements 42 formed using light guide structures. The light guide structures of FIG. 4 may include multiple light guide layers stacked in the Z dimension. Light guide structures 48 may be supported on a substrate such as a transparent housing member (e.g., a transparent substrate in the head-mounted support structure of device 10 such as housing 12 on front face F of device 10 of FIG. 3). Light guide structures 48 may be edge illuminated. For example, an array of light sources 44 (e.g., light-emitting diodes, lasers, etc.) may be formed along the peripheral edge of light guide structures 48 in rim member 46. Rim member 46 may be formed from an opaque housing structure that runs along a peripheral edge of the transparent housing member forming front face F of device 10. Control circuitry in device 10 may individually control light sources 44 associated with different light guide layers in structures 48 to control the amount of light emitted by corresponding areas of light guide structures 48. For example, different light sources may be activated to create light respectively in light-emission areas A1, A2, and A3 in the example of FIG. 4.

Figure 5:
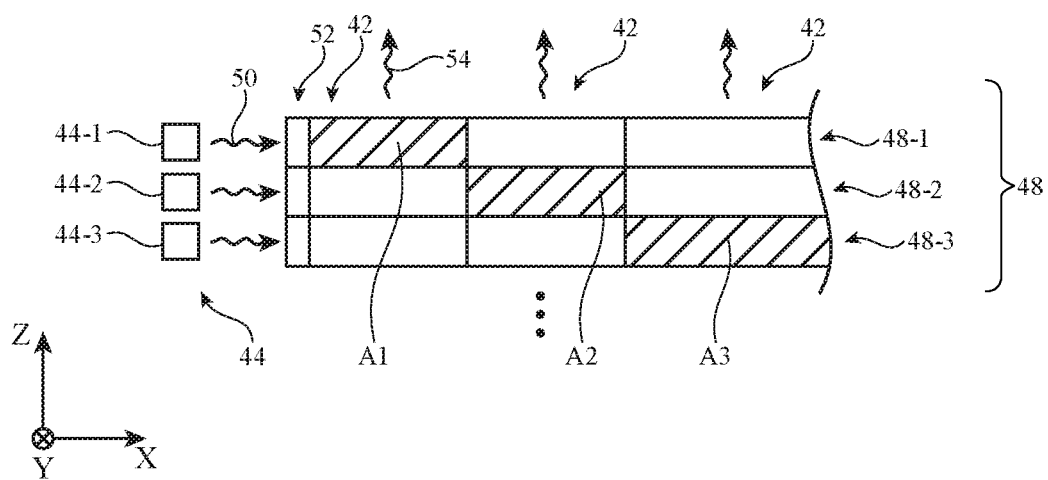
FIG. 5 is a cross-sectional side view of the peripheral portion of FIG. in accordance with an embodiment.

FIG. 5 is a cross-sectional side view of the illustrative layered light guide structures of FIG. 4 taken along line 60 and viewed in direction 62. As shown in FIG. 5, light guide structures 48 include first light guide layer 48-1, second light guide layer 48-2, and third light guide layer 48-3. Light source 44 may include individually adjustable light-emitting devices 44-1, 44-2, and 44-3, each of which can be adjusted by the control circuitry of device 10 to emit a desired amount (and, if desired, a desired color) of light 50. Light source 44 (e.g., light-emitting diodes, lasers, etc.) may be mounted in peripheral support structures such as rim member 46 (e.g., the rim portion of housing 12 that surrounds the peripheral of the transparent housing member (housing layer) other clear structures that cover device 10).

The light 50 emitted by each light-emitting device (light source) 44 may be coupled into the edge of a respective light guide layer using optional optical couplers 52 (e.g., lenses, light collimators, prisms, and/or other light-coupling structures). Light-scattering structures are formed selectively in layer 48-1 (in area A1), in layer 48-2 (in area A2), and in layer 48-3 (in area A3). These light-scattering structures may include voids, high-refractive-index particles (e.g., particles with a different refractive index that a polymer or other light guide material in which the particles are embedded), pits, grooves, or other surface depressions, bumps, ridges, or other surface protrusions, and/or other light-scattering structures that locally defeat total internal reflection and cause light 50 to scatter outwardly (towards eye box 18) as light 54 of FIG. 5.

Different areas of light guide structures 48 may have light-scattering structures. The light that is emitted into light guide structures 48 may be selectively scattered out of light guide structures using these selectively located light-scattering structures. As shown in FIG. 4, for example, light source 44' may emit light 50 that travels in three different light guide layers to light-scattering structures located respectively in first, second, and third layers. The first layer may have light-scattering structures in area A1, the second layer may have light-scattering structures in area A2, and the third layer may have light-scattering structures in area A3. With this type of arrangement, light-emitting device 44-1 may emit light into layer 48-1 that is coupled outwardly as light 54 in area A1, light-emitting device 44-2 and layer 48-2 may be used to emit light in area A2, and light-emitting device 44-3 and layer 48-3 may be used to emit light from area A3. Light-emitting areas A1, A2, and A3 and the associated light-emitting devices of light source 40 in this arrangement serve as light-emitting elements 42. If desired, additional light-guide layers and light-emitting devices may be provided to form additional light-emitting elements 42.

Figure 6:
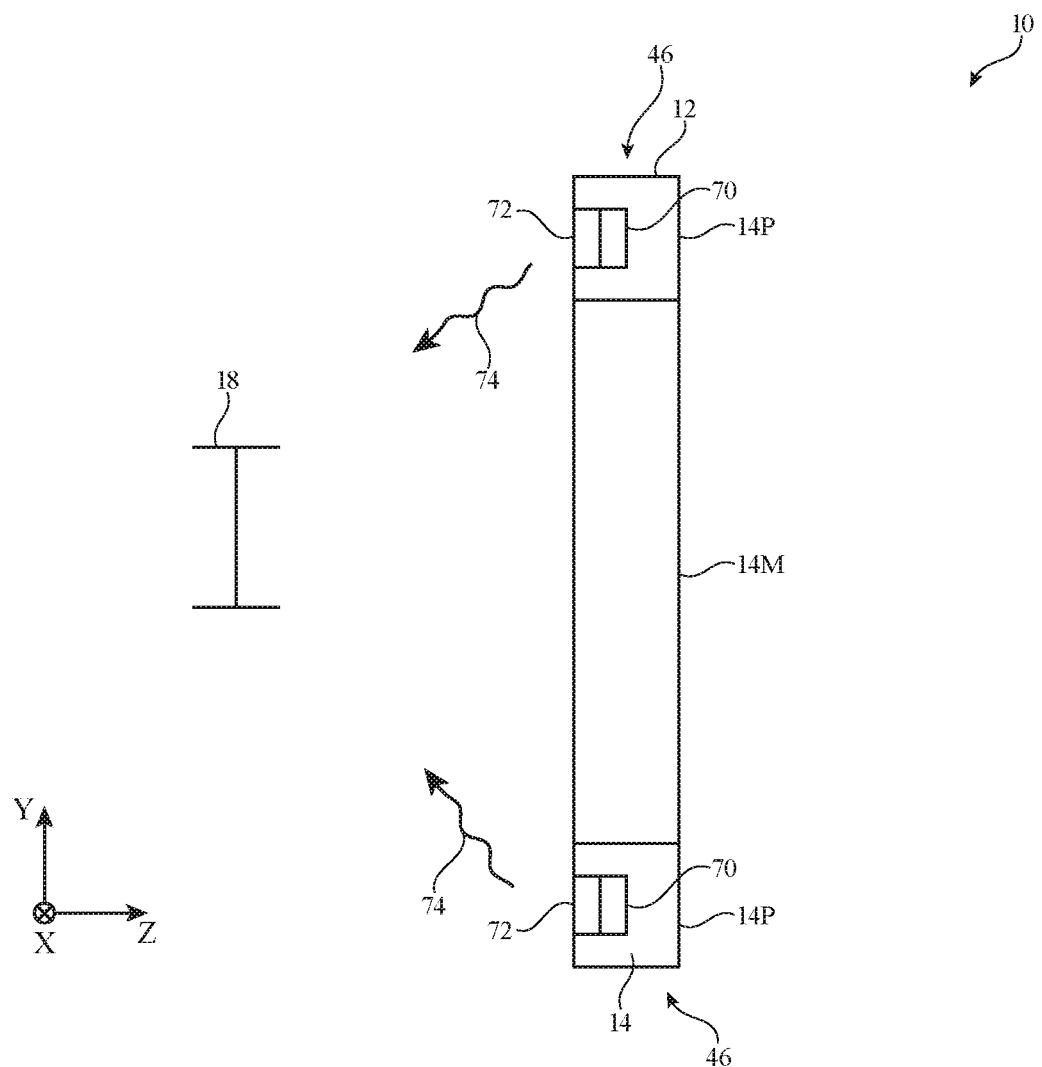
FIG. 6 is a cross-sectional side view of a head-mounted support structure with a transparent housing member and light sources mounted in a peripheral rim member running along a peripheral edge of the transparent housing member in accordance with an embodiment.

Another illustrative configuration for forming peripheral display 14P is shown in FIG. 6. As shown in FIG. 6, rim portion 46 of housing 12 may be provided with light sources such as light sources 70 (e.g., light-emitting diodes, lasers, etc.) and may be provided with optional adjustable optical components 72 such as beam steering devices (e.g., adjustable mirrors, etc.) and/or other adjustable optical devices (e.g., adjustable lenses, etc.). Light sources 70 may be mounted along the periphery of a transparent housing member (e.g., a substrate for display 14M) in rim member 46. The color and intensity of emitted light 74 can from display 14P may be controlled by adjusting light-emitting devices such as light sources 70. The angle of emitted beams of light relative to eye box 18 (e.g., the apparent location of a light-emitting element 42 that is associated with a given beam of emitted light) and/or beam divergence can be adjusted by adjusting a scanning mirror or other adjustable beam steerer and/or an adjustable lens (see, e.g., illustrative adjustable optical components 72).

Figure 7:
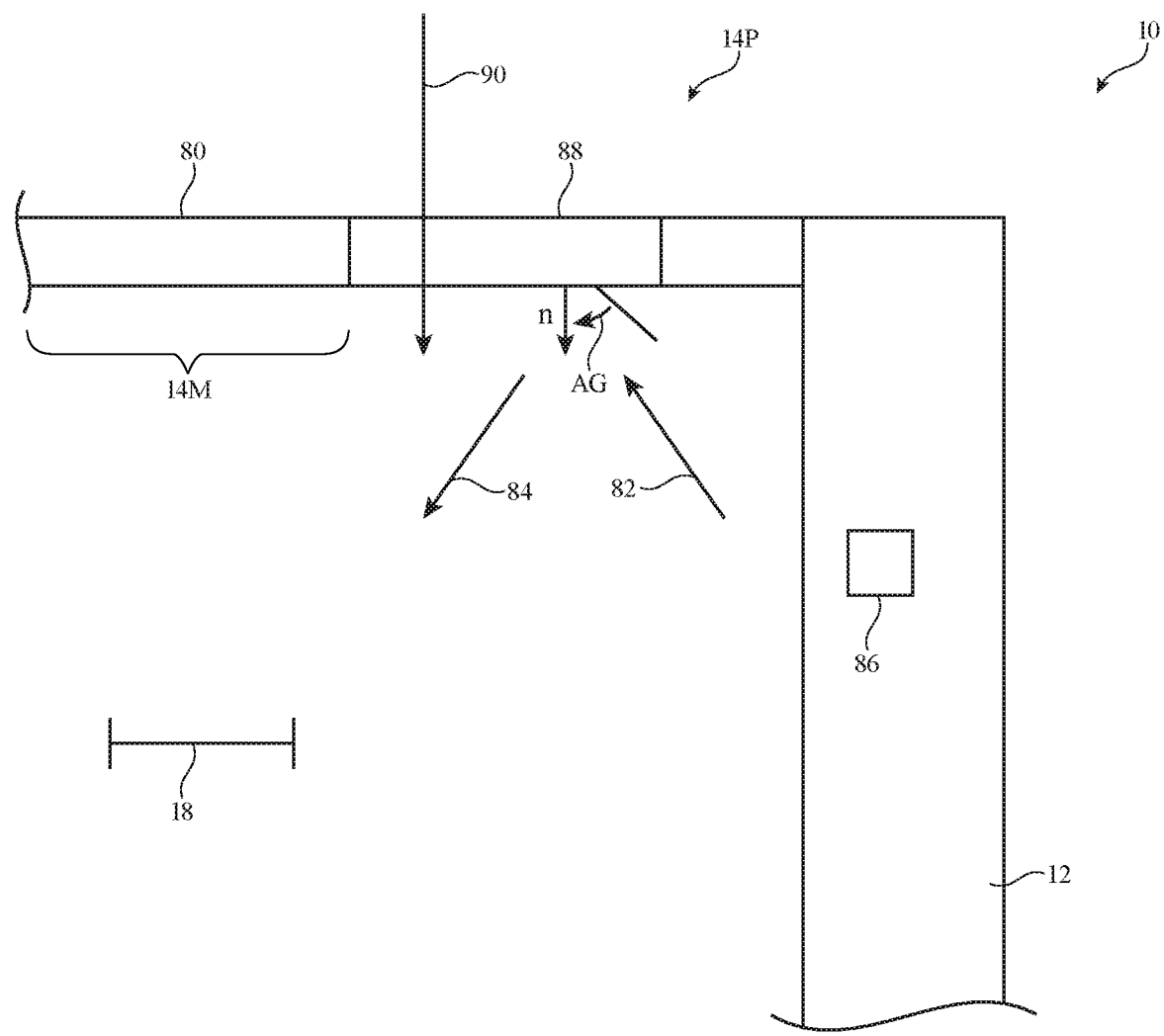
FIG. 7 is a top view of a corner portion of an illustrative electronic device in accordance with an embodiment.

In the example of FIG. 7, transparent housing member 80 has a central portion that forms a waveguide and/or other structures for display 14M. In the peripheral portion of member 80 that forms peripheral display 14, member 80 includes an optical element 88 such as a dispersion film formed from metal flakes or other nanoparticles that exhibits high reflectivity for incoming light at a particular range of off-axis angles (e.g., angles about angle AG in the example of FIG. 7). Angle AG is a non-zero angle (e.g., an angle of 15-85° or other suitable angle relative to surface normal n of member 80).

Real-world light from a real world object such as real-world light 90 tends to be oriented perpendicular to the surface normal of element 88. The transmission of this light through element 88 is relatively unaffected by the presence of the nanoparticles of the dispersion film. Accordingly, a user with eyes in eye boxes 18 may view real-world objects normally (e.g., element 88 exhibits high light transmission for real-world image light). At the same time, the high reflectivity of element 88 for off-axis light such as light beam 82 allows element 88 to help serve as peripheral display 14P. In particular, an off-angle light source such as light source 86 can selectively emit one or more angle beams of light (see, e.g., beam 82) at one or more angles close to angle AG with respect to surface normal of element 88. Due to the nature of the dispersion film used in forming element 88, this light is highly reflected by element 88 and reflects as light beam 84 toward eye box 18. If desired, an adjustable optical component (e.g., an adjustable lens, a beam steerer, etc.) can be placed in front of light source 86, allowing the angle of reflected light beams such as light beams 82 and 84 to be adjusted.

Figure 8:
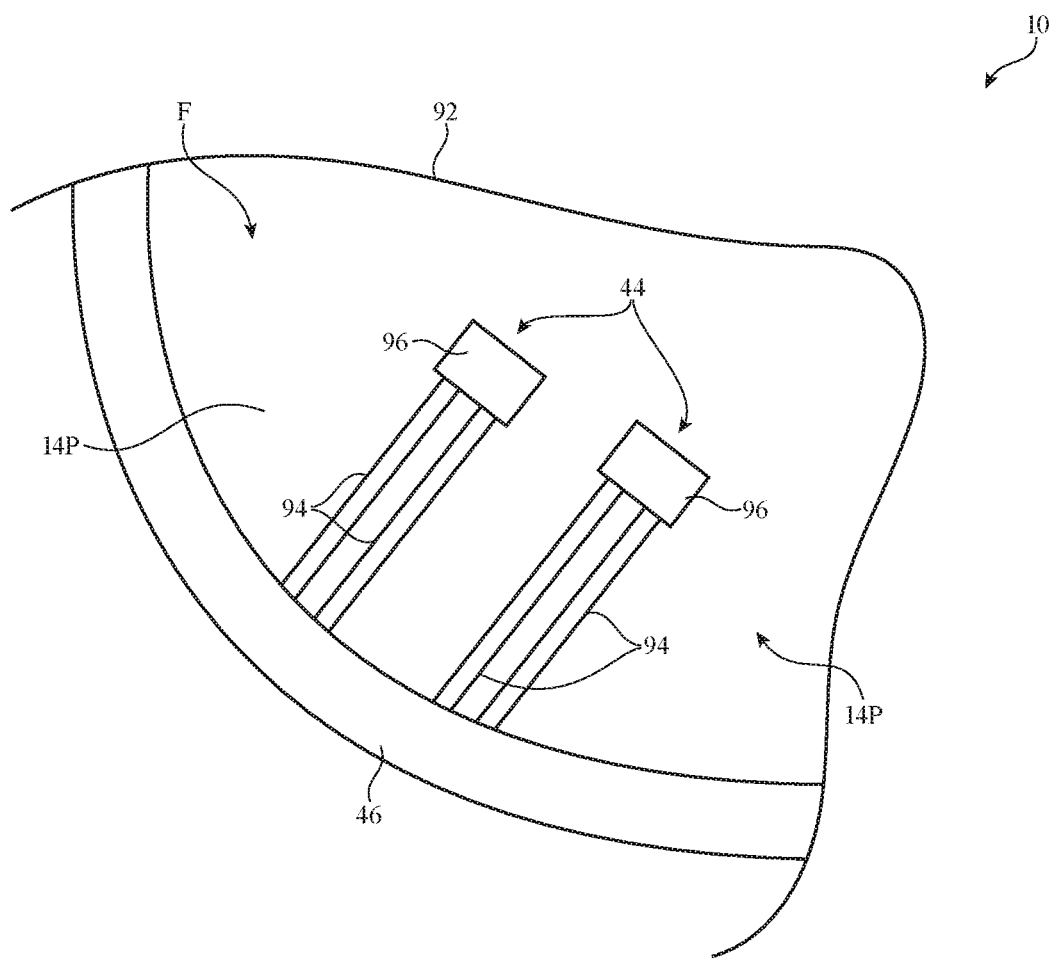
FIG. 8 is a front view of a portion of a rim member and transparent housing member with light-emitting dies such as light-emitting diode dies and/or laser diode dies in accordance with an embodiment.

FIG. 8 shows another illustrative configuration for forming peripheral display 14P. As shown in FIG. 8, display 14 may have a transparent housing member 92 surrounded by a peripheral housing structure such as rim member 46. Member 46 may run along the peripheral edge of the housing structures at front face F of device 10. Member 92 may be a transparent layer (e.g., a layer of polymer, glass, or other transparent material, which may sometimes be referred to as a transparent housing wall or transparent housing member). This housing structure may have a central portion that overlaps main display 14M and a peripheral portion that overlaps peripheral display 14P. Member 92 may serve as a substrate for transparent conductive lines 94 such as indium-tin oxide traces. Transparent conductive lines 94 will not be visible in transmission, so that a user may view the real world through front face F. At the same time, lines 94 may be used to electrically connect electrical components in device 10 to light sources 96 (e.g., light-emitting diodes, lasers, etc.). For example, control circuitry in rim member 46 may be electrically coupled to light sources 96 using conductive paths such as lines 94, thereby forming individually adjustable light-emitting elements 44 for peripheral display 14P. To enhance light transmission, light sources 96 may be formed from small light-emitting diode dies (e.g., micro-light-emitting diode dies or mini-light-emitting diode dies).

The structures of peripheral display 14P may also exhibit low haze (e.g., haze less than 5%, less than 3%, or less than 1%, as examples). Device 10 may, if desired, have transparent housing members (e.g., housing layers such as layer 92 of FIG. 8, member 80 of FIG. 7, etc.) with planar cross-sectional profiles and/or with curved cross-sectional profiles. The light sources used in peripheral display 14P may use relatively low amounts of power, thereby helping to reduce power consumption by device 10.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment
    A physical environment or real-world environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality
    In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment, Mixed reality In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device that is configured to allow viewing of a real-world object, comprising:
a head-mounted support structure;
a main display that has a display device to generate a display image and that is configured to merge the display image with light from the real-world object for viewing in an eye box; and
a peripheral display, wherein the head-mounted support structure is configured to support the main display and the peripheral display, wherein the peripheral display is configured to emit unfocused, diffuse illumination toward the eye box, wherein the peripheral display is transparent and the real-world object is visible through the peripheral display from the eye box, and wherein the peripheral display comprises:
light guide structures, and
light-emitting devices that provide light to the light guide structures, wherein the light is scattered out of the light guide structures toward the eye box, and wherein there are no lenses between the light-emitting devices and the eye box.

2. The head-mounted device defined in claim 1 wherein the light guide structures comprise multiple light guide layers, each of which has light-scattering structures in a respective light-emission area and wherein each of the light-emitting devices provides light to a respective one of the light guide layers that is scattered out of that light guide layer toward the eye box from the light-emission area of that light guide layer.

3. The head-mounted device defined in claim 2 wherein each light-emitting device is a light-emitting diode die.

4. The head-mounted device defined in claim 2 wherein each light-emitting device is a laser.

5. The head-mounted device defined in claim 1 wherein the head-mounted support structure has a transparent layer with a portion that is configured to:
pass real-world light that is parallel to a surface normal of the transparent layer; and
reflect off-axis light reaching the portion at a non-zero angle with respect to the surface normal.

6. The head-mounted device defined in claim 5 wherein the portion comprises a dispersion film, the peripheral display further comprising a light source coupled to the head-mounted support structure, wherein the light source is configured to emit a beam of light that reflects from the dispersion film to the eye box.

7. The head-mounted device defined in claim 1 wherein the head-mounted support structure has a transparent member surrounded by a peripheral rim member and wherein the peripheral display comprises optical components in the peripheral rim member.

8. The head-mounted device defined in claim 7 wherein the optical components comprise a light source that emits the diffuse illumination.

9. The head-mounted device defined in claim 7 wherein the optical components comprise adjustable optical components configured to adjust the diffuse illumination.

10. The head-mounted device defined in claim 9 wherein the optical components comprise a beam steerer.

11. The head-mounted device defined in claim 8 wherein the light source comprises a plurality of light-emitting devices coupled to the head-mounted support structure along the peripheral rim member.

12. The head-mounted device defined in claim 1 wherein the main display comprises a waveguide.

13. The head-mounted device defined in claim 1 further comprising a light source, wherein the head-mounted support structure has a transparent member with a central portion that overlaps the main display and a peripheral portion that overlaps the peripheral display and has a peripheral rim member coupled to the transparent member and wherein the peripheral display comprises traces of transparent conductive material on the transparent member that extend away from the peripheral rim member and that are configured to supply signals to the light source.

14. A head-mounted device that is configured to allow viewing of a real-world object, comprising:
a head-mounted support structure having a transparent member through which the real-world object is viewable from an eye box;
a main display configured to display an image to the eye box that is overlaid over the real-world object;
light guide structures supported by the transparent member; and
light-emitting devices configured to supply light to the light guide structures that is guided by the light guide structures and emitted from the light guide structures towards the eye box as diffuse peripheral illumination, wherein there are no lenses between the light-emitting devices and the eye box.

15. The head-mounted device defined in claim 14 further comprising control circuitry configured to adjust the light-emitting devices to supply a visual alert using the diffuse peripheral illumination.

16. The head-mounted device defined in claim 14 further comprising control circuitry configured to adjust the displayed image and the diffuse peripheral illumination to provide object persistence as an object in the image moves from a non-peripheral vision region to a peripheral vision region.

17. A head-mounted device, comprising:
- a display device that generates image light;
- a head-mounted support structure that supports the display device;
- a waveguide that receives the image light;
- an output coupler that is configured to direct the image light out of the waveguide towards an eye box while allowing viewing of real-world objects through the output coupler from the eye box;
- a light-emitting die; and
- light guide structures that are configured to receive light from the light-emitting die and guide the light to a light scattering area on the light guide structures at which the light is scattered toward the eye box as unfocused, diffuse illumination, wherein there are no lenses between the light-emitting die and the eye box.

18. The head-mounted device defined in claim 17 wherein the head-mounted support structure has a transparent layer with a peripheral portion that overlaps the light guide structures.

19. The head-mounted device defined in claim 18 wherein the light guide structures are configured to allow real-world images to pass through the light guide structures and be viewed from the eye box.

* * * * *